US010685453B1

(12) United States Patent
Trail

(10) Patent No.: US 10,685,453 B1
(45) Date of Patent: Jun. 16, 2020

(54) FOLDED LASER EMITTERS FOR STRUCTURED LIGHT APPLICATIONS

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 84 days.

(21) Appl. No.: 15/965,234

(22) Filed: Apr. 27, 2018

Related U.S. Application Data

(60) Provisional application No. 62/503,699, filed on May 9, 2017.

(51) Int. Cl.
| | |
|---|---|
| *G06T 7/521* | (2017.01) |
| *G02B 27/01* | (2006.01) |
| *G06K 9/00* | (2006.01) |
| *H04N 5/225* | (2006.01) |
| *G06T 7/586* | (2017.01) |
| *H04N 13/332* | (2018.01) |
| *H04N 13/00* | (2018.01) |

(52) U.S. Cl.
CPC .......... *G06T 7/521* (2017.01); *G02B 27/0172* (2013.01); *G06K 9/00671* (2013.01); *G06T 7/586* (2017.01); *H04N 5/2256* (2013.01); *H04N 13/332* (2018.05); *G02B 2027/0178* (2013.01); *H04N 2013/0081* (2013.01)

(58) Field of Classification Search
CPC ....... G06T 7/521; G06T 7/586; H04N 13/332; H04N 5/2256; H04N 2013/0081; G02B 27/0172; G02B 2027/0178; G06K 9/00671
See application file for complete search history.

(56) References Cited

U.S. PATENT DOCUMENTS

2016/0209655 A1* 7/2016 Riccomini .......... G02B 27/0172
2017/0295362 A1* 10/2017 Travis .................. H04N 13/383

* cited by examiner

*Primary Examiner* — Robert J Michaud
(74) *Attorney, Agent, or Firm* — Fenwick & West LLP

(57) ABSTRACT

A depth camera assembly includes an illumination source, and an imaging device. The illumination source includes one or more emitters on a single substrate, and one or more folding elements folding at least an optical path of the projected light from each emitter. Each emitter emits a respective beam of light. The imaging device captures images of the local area illuminated with the light from the illumination source. In some configurations, the depth camera assembly includes a controller that provides images to a console that determines a depth information based in part on images of the local area illuminated with the light from the illumination source, and generates a virtual object based in part on the depth information.

18 Claims, 8 Drawing Sheets

FOLDED LASER EMITTERS FOR STRUCTURED LIGHT APPLICATIONS

CROSS REFERENCE TO RELATED APPLICATIONS

This application claims the benefit of U.S. Provisional Application No. 62/503,699, filed May 9, 2017, which is incorporated by reference in its entirety.

BACKGROUND

The present disclosure generally relates to virtual or augmented reality systems, and more specifically relates to an illumination source assembly including one or more emitters and one or more fold elements in a depth camera assembly configured to determine one or more depth information of a local area.

Virtual reality (VR) systems or augmented reality (AR) systems (generically categorized under Mixed Reality (MR)), can leverage the capture of the environment surrounding a user in three dimensions (3D). This is captured traditionally through depth camera imaging architectures, and examples herein for obtaining 3D information of a scene include e.g., stereo vision, time-of-flight (ToF) and structured light (SL). Different depth camera imaging architectures provide different strengths and weaknesses, so certain depth camera imaging architectures may provide better performance than others in different operating conditions. For instance, stereo vision architectures operate well with ambient illumination, while ToF architectures have an active illumination source which may be impaired by limitations in signal-to-noise ratio from ambient illumination. However, because of the relatively large size of conventional depth camera imaging architectures, many systems including a depth camera typically use a single type of depth camera imaging architecture configured for a particular use case. As head-mounted and other MR systems are increasingly used to perform a broader range of functions in varied operating conditions and environments, selecting a depth camera imaging architecture to obtain more complete or robust depth information of a local area surrounding the system and the user may use more capability and flexibility within the same volume and weight limitations otherwise imposed.

SUMMARY

Embodiments relate to a depth camera assembly that includes an illumination source, and an imaging device. The illumination source includes one or more emitters on a single substrate, and one or more folding elements folding at least an optical path of the projected light from each emitter. Each emitter emits a respective beam of light. The imaging device captures images of the local area illuminated with the light from the illumination source.

Embodiments also relate to a head mounted-display (HMD) that includes an electronic display and a depth camera assembly. The electronic display emits image light. The depth camera assembly includes an illumination source, an imaging device, and a controller. The illumination source includes one or more emitters on a single substrate, and one or more folding elements folding at least an optical path of the projected light from each emitter. Each emitter emits a respective beam of light. The imaging device captures images of the local area illuminated with the light from the illumination source. The controller provides images to a console that determines a depth information based in part on images of the local area illuminated with the light from the illumination source, and generates a virtual object based in part on the depth information.

In some embodiments, the controller generates one or more emission instructions in accordance with the generated virtual object and provides the one or more emission instructions to the illumination source. In some embodiments, the controller adjusts one or more optical properties of the respective beam of light emitted from the illumination source, and controls a timing of the imaging device in accordance with the one or more optical properties of the respective beam of light.

Figure 1:
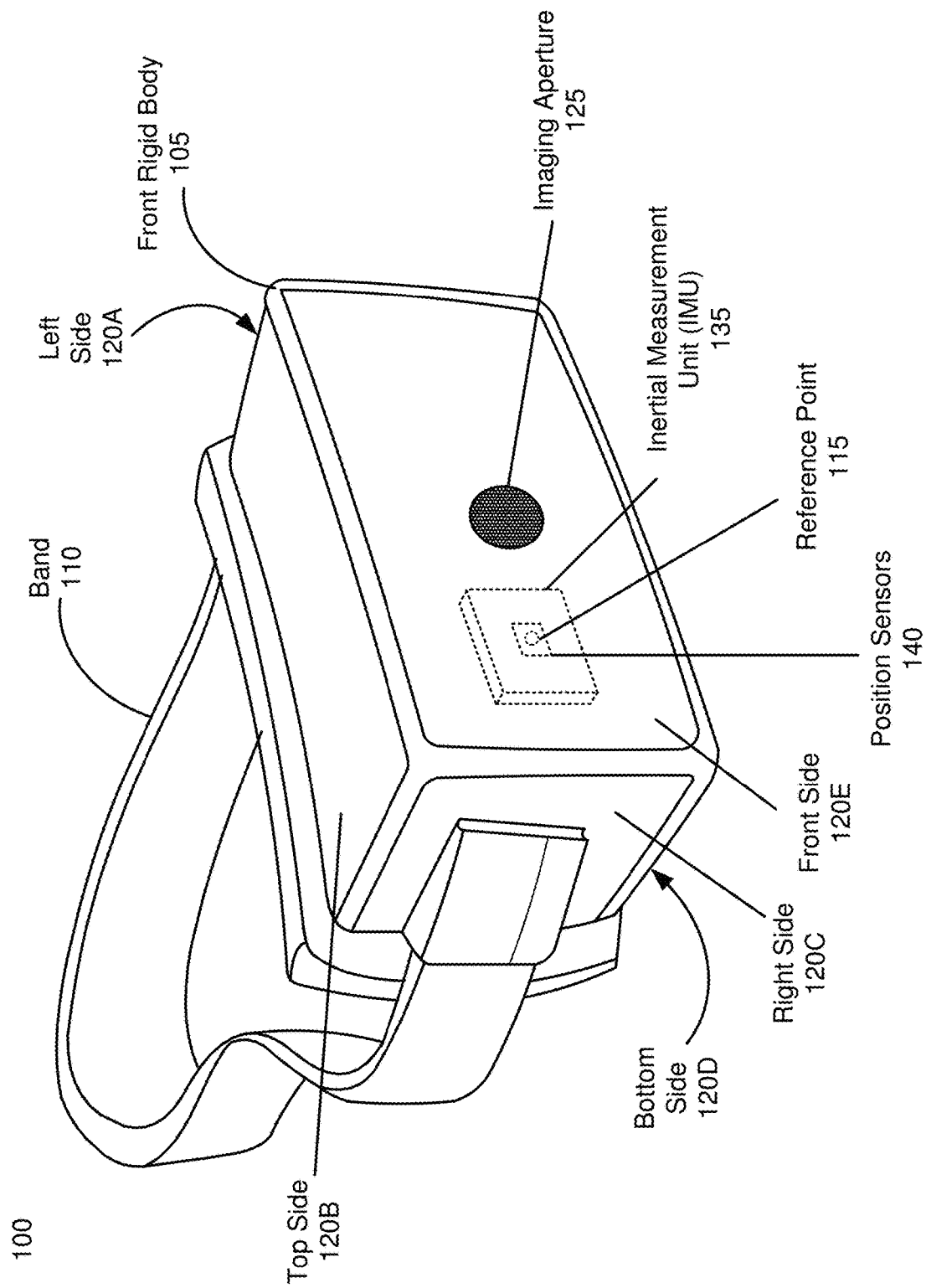
FIG. 1 is a wire diagram of one embodiment of a head-mounted display

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the design of HMDs, the typical design constraints considered include size, weight, and output power of the system. Such designs of HMDs often involve a trade-off in the system performance in order to balance comfort and other human factors. For the specific case of illumination for structured light applications, package layouts are desired to be small in every dimension, specifically in the axis away from the user's facial interface which would pull the center of mass away from the user, while still be able to meet the required output power.

Disclosed is a depth camera assembly (DCA) capturing data describing depth information in a local area surrounding the DCA that provides such flexibility and packaging options through the use of a multiple emitter laser configuration. The DCA includes an imaging device, a controller, and an illumination source assembly. The illumination source assembly includes one or more emitters and one or more fold elements located on a single substrate. An emitter emits a source light to the fold element. A fold element (e.g., a prism, diffractive element, or mirror) folds the optical path of the source light received from each of the emitters. Light from the one or more emitters may be folded differently such that each emitter has its own, and potentially unique, optical path. For instance, assuming the emitters are still co-aligned and located on a single output face, various combinations of fold elements can be utilized to change the laser output orientation (in angle) from one emitter to the other. In one embodiment, a flat turning mirror is used as a fold element for all emitters to allow a smaller package. In another configuration, each emitter has a different or no fold element at all. The imaging device captures images of the local area illuminated with the light from one or more of the plurality of emitters. The images may be used by, e.g., a controller to determine one or more depth information for a local area via a variety of techniques including, e.g., stereo vision, photometric stereo, structured light (SL), time-of-flight (ToF), or some combination thereof.

A common substrate is used to hold the one or more emitters and one or more fold elements as part of the illumination source assembly. The common substrate provides for more than one edge emitter laser to be configured, thereby providing flexibility to utilize the capability of a multiple emitter laser configuration. In the configuration disclosed, the emitter is paired with fold elements such as prisms and/or mirrors in order to facilitate another degree of control in both package envelope and angular orientation.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a wire diagram of one embodiment of a HMD 100. The HMD 100 includes a front rigid body 105, a band 110, a reference point 115, a left side 120A, a top side 120B, a right side 120C, a bottom side 120D, and a front side 120E. The HMD 100 may be part of, e.g., a VR system, an AR system, a MR system, or some combination thereof. In embodiments that describe AR system and/or a MR system, portions of the front side 120E of the HMD 100 are at least partially transparent in the visible band (~380 nm to 750 nm), and portions of the HMD 100 that are between the front side 120E of the HMD 100 and an eye of the user are at least partially transparent (e.g., a partially transparent electronic display). In alternate embodiments, the depth camera assembly inside the HMD 100 may also work in a remote system such as a remote 'tower', a cellphone, or any other wearable, off-head, devices.

The HMD 100 includes an imaging aperture 125. An imaging device captures light from an illumination source (not shown) and ambient light in a local area through the imaging aperture 125. The illumination source includes one or more emitters and one or more fold elements in a depth camera assembly configured to determine one or more depth information of a local area. The front rigid body 105 includes one or more electronic display elements of an electronic display (not shown), an IMU 135, one or more position sensors 140, and a reference point 115, as described in detail below in conjunction with FIG. 8.

Figure 2:
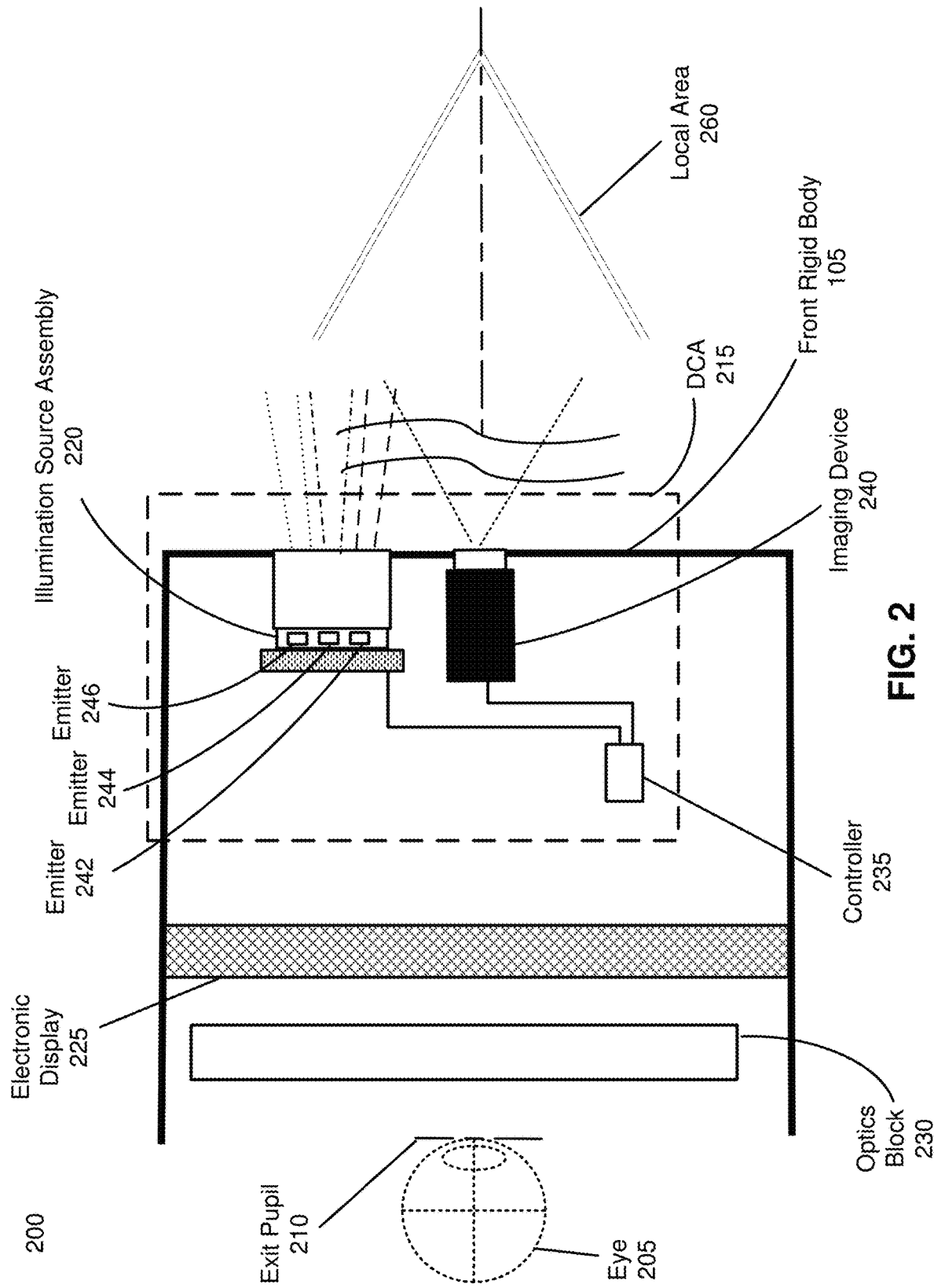
FIG. 2 is a cross section of the head-mounted display of FIG. 1, in accordance with an embodiment.

FIG. 2 is a cross section 200 of the HMD 100, in accordance with an embodiment. The front rigid body 105 includes a depth camera assembly (DCA) 215, an electronic display 225, and an optics block 230. Some embodiments of the HMD 100 have different components than those described here. Similarly, in some cases, functions can be distributed among the components in a different manner than is described here. The front rigid body 105 also includes an exit pupil 210 where an eye 205 of a user would be located. For purposes of illustration, FIG. 2 shows the cross section 200 of the front rigid body 105 in accordance with a single eye 205. Although FIG. 2 depicts a center cross-section of the eye 205 as being in the same plane as the DCA 215, the center cross-section of the eye 205 and the DCA 215 do not have to be in the same plane. Additionally, another electronic display 225 and optics block 230, separate from those shown in FIG. 2, may be included in the front rigid body 105 to present content, such as an augmented representation of a local area 260 or virtual content, to another eye of the user.

The depth camera assembly (DCA) 215 includes an illumination source assembly 220, a controller 235, and an imaging device 240. The illumination source assembly 220 illuminates the local area 260 with light. The local area 260 is an area surrounding the HMD 100 and includes objects in a field of view of the imaging device 240. The illumination source assembly 220 includes one or more illumination units. Illumination units are described in detail below with regard to FIGS. 3A-7B. An illumination unit includes one or more emitters and one or more fold elements (not illustrated). In some embodiments, the illumination source assembly 220 includes a single substrate that holds the one or more emitters and one or more fold elements. Each of the emitters mounted on the single substrate emit light onto the local area 260. A fold element is an optical device that folds at least some portion of an incident light from each of the emitters in any arbitrary direction.

In one configuration, a fold element can be utilized for all emitters to allow a smaller package. In a different configuration, each emitter can have a different (or none at all) fold element. In an alternate configuration, one or more of the light emitted by the emitters would be incident on the fold element, while one or more of the emitted light would not be, facilitating an angular offset of 0 to 90 degrees, or more, between the two optical paths. In yet another configuration, the emitters do not have to emit from the same surface. Instead, one or more optical path can go through a front face of the emitter, while one or more optical path can then be allowed to emit from the back face of the emitter along with passing through an optional one or more fold elements.

Additionally, in some configurations, a plurality of surfaces of the fold elements may be shaped to be spherically concave (e.g., a portion of a sphere), spherically convex, a rotationally symmetric sphere, a freeform shape, or some other shape to adjust optical power of light from an emitter. In some embodiments, the shape of the plurality of surfaces of the fold elements is designed to additionally correct for some forms of optical aberration. In some embodiments, the fold elements may have a plurality of coatings, such as anti-reflective coatings (prism primarily) or reflective coatings (fold mirror, etc.), to reduce ghost images and enhance contrast. In an alternate configuration, the fold element may include polarization coatings or layers composed of materials, for example, a birefringent material (e.g., quartz), organic material sheets, liquid crystal, or some combination thereof.

In some configurations, the fold elements include beam splitters consisting of a reflective dielectric coating. In this configuration, certain parameters of the incident emitter illumination can dictate what fraction is transmitted or reflected. For instance, it may be a polarization sensitive reflective dichroic that will reflect nearly 100% of in-plane (P-state) polarization, and transmit nearly 100% of out-of-plane (S-state) polarization. Then there could be another fold mirror or dichroic element that reflect the transmitted (S-state) polarization to the same angle (with a lateral offset) or completely new angle as chosen by the system utility. In addition, there can be passive optical elements, such as diffractive optical elements or birefringent media such as a waveplate, to alter the polarization state of the light between the two fold elements. In an alternate configuration, the fold element may have a respective transmission passband and a respective reflection passband. A transmission passband is a band of wavelengths within which the fold element transmits an incident light. A reflection passband is a band of wavelengths within which the fold element reflects an incident light.

In one embodiment, the illumination source assembly 220 includes an emitter 242, an emitter 244, and an emitter 246. A typical emitter could be a laser diode made by a semiconductor fabrication process. A plurality of laser diodes could be made on a single substrate, and maintained in as-fabricated orientation (common structure carrier, inheriting semiconductor/lithographic precision) in the illumination source assembly 220. In one embodiment, spacing between laser diodes may be 50 to 300 microns. In other embodiments, the spacing between laser diodes ranges from 0.3 mm to 1.5 mm. Neighboring emitters in the illumination source assembly 220 may be spaced equally, or in some embodiments, unequally.

The illumination source assembly 220 may generate structured light patterns using light from the one or more illumination units. The illumination source may also include one or more optical elements such as a common collimator lens and a DOE (not shown). At least one of the emitter 242, the emitter 244, and the emitter 246 emit light through the DOE to create a structured light pattern. The structured light produced is a specified pattern, such as a symmetric or quasi-random dot pattern, grid, or horizontal bars. The illumination source assembly 220 projects the structured light pattern(s) into the local area 260.

The imaging device 240 captures images of the local area 260. The imaging device 240 may include one or more detectors and one or more optical elements (e.g., one or more lenses, a diffractive element, a wavelength filter, a polarizer, an aperture, or some combination thereof). The imaging device 240 may capture and record particular bands of light or specific polarizations of light. For example, the imaging device 240 may capture images including light in the visible band and in the infrared band. The imaging device 240 may capture images including light of specific polarizations (e.g. circularly, linearly polarized light). In some embodiments, the imaging device 240 may include a lens array that presents multiple images of the local area across different regions of a detector of the imaging device 240.

The controller 235 is configured to determine emission instructions based in part on a digital model of the local area 260. The controller 235 provides the emission instructions to the illumination source assembly 220 and determines first depth information based on images of the local area 260 illuminated with the light from the emitter 242. Similarly, the controller 235 determines second depth information based on images of the local area 260 illuminated with the light from the emitter 244. The controller 235 updates the digital model of the local area 260 based on the first depth information and the second depth information.

In some embodiments, the controller 235 is configured to determine depth information for objects in the local area 260 using one or more images. The controller 235 controls how light is emitted from the illumination source assembly 220 and how the imaging device 240 captures light. For example, the controller 235 instructs one or more emitters in the illumination source assembly 220 to emit light. In this manner, the controller 235 controls properties such as timing, intensity, wavelength range, polarization, field of view limits, and density (in the case of SL) of the illumination source assembly 220. The controller 235 can also control the timing of when data is collected from the imaging device 240. Thus, the controller 235 can coordinate the capturing of data by the imaging device 240 with light emission by the illumination source assembly 220. In alternate embodiments, some other device (e.g., a console) determines depth information for the local area 260.

In some embodiments (not shown), a DCA (like the DCA 215) may be used as an eye tracker that tracks the gaze location of the user's eye 205 by determining a position and orientation of the user's eye 205 within an eyebox over a period of time. The eyebox may be a target area surrounding the DCA. The DCA may use the depth information determined by a controller of the DCA to track the location of the user's eye 205.

In some embodiments, the controller 235 is configured to determine depth information based in part on the technique employed for capturing depth information. For example, the depth information could be determined by using one or a combination of the following techniques: stereo vision, photometric stereo, SL, and ToF.

The controller 235 may also cause the DCA 215 to capture depth information using a (active or assisted) stereo vision technique. In one embodiment, the controller 235 controls two or more detectors from the imaging device 240 to capture light reflected off of the local area 260. The detectors of imaging device 240 are located a fixed distance apart from each other and can be used to extract depth information. Each detector collects light that is reflected from the local area 260 (e.g., one or more objects in the local area 260). In an alternative embodiment, the controller 235 coordinates the emitting of light from the illumination source assembly 220 with the collection of light from two or more detectors located inside the imaging device 240. The data collected by the controller 235, which contains data from different vantage points, can be compared to determine depth information.

The controller 235 may also cause the DCA 215 to capture depth information using a photometric stereo technique. The controller 235 coordinates the emitting of light from two or more emitters of the plurality of emitters with the collection of light from the imaging device 240. The data collected by the controller 235, which includes data with different lighting conditions, can be used to determine depth of objects in the local area 260.

The controller 235 may also cause the DCA 215 to capture depth information using a SL technique. In one embodiment, the controller 235 controls an illumination source assembly 220 to emit SL with a specific pattern onto the local area 260. The controller 235 can turn on one or more emitters of the illumination source assembly 220 to increase the density, field of view, or baseline of the specific pattern. For example, the controller 235 may activate more emitters if the local area 260 includes an object with fine detail. The controller 235 coordinates the emitting of the SL from the illumination source assembly 220 with the collection of light by the imaging device 240. The data collected by the controller 235, which includes SL information, can be used to determine depth of objects in the local area 260. The controller 235 can also activate each emitter at different times and use the imaging device 240 to capture multiple images for the multiple emitters, improving the accuracy of depth determination.

The controller 235 may also cause the DCA 215 to capture depth information using a ToF technique. In one embodiment, the controller 235 controls the time when one or more emitters are activated in the illumination source assembly 220, and effectively measures the accumulated phase offset (comparable to time difference) it takes for the emitted light to be reflected from the local area 260 and detected by the imaging device 240. The data collected by the controller 235, which includes ToF information, can be used to determine depth of objects in the local area 260.

Figure 3A:
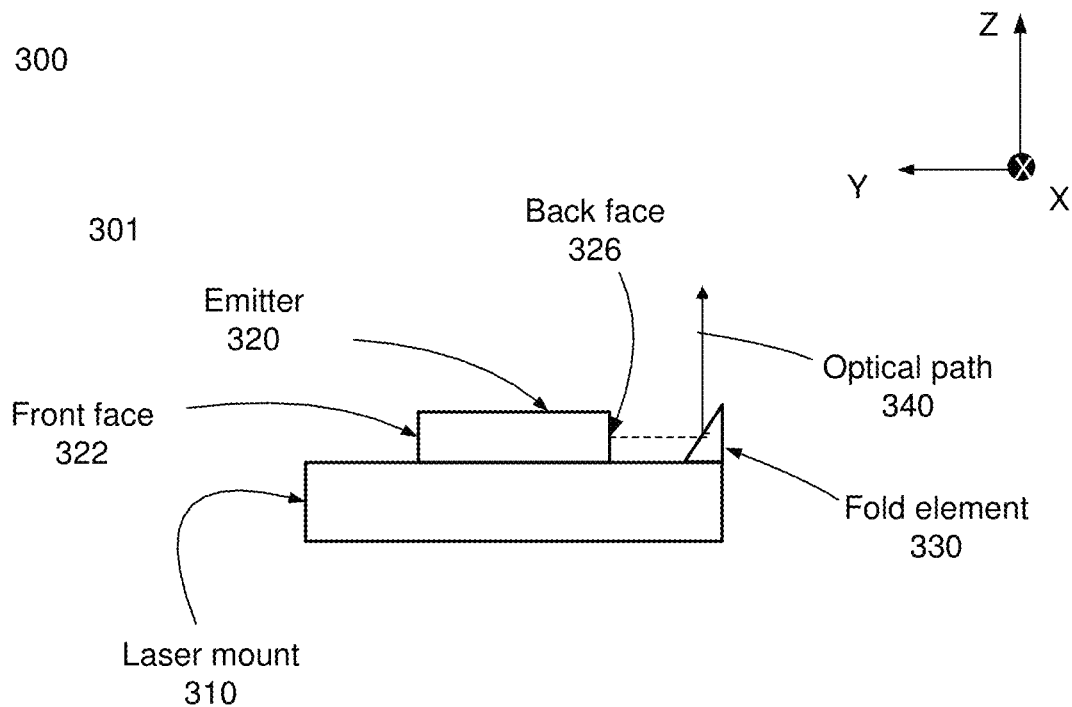
FIG. 3A is a side view of an illumination unit with a single optical path from a back face 36 and a single fold element, in accordance with an embodiment.

FIG. 3A is a side view 300 of an illumination unit 301 with a single optical path from a back face 326 and a single fold element 330, in accordance with an embodiment. In some embodiments, the illumination unit 301 may be part of the illumination source assembly 220. In alternate embodiments, the illumination unit 301 may be a component of some other system that utilizes laser light (e.g., a laser ranging system, proximity sensor, illumination for non-visible image collection, autofocus sensor assist, etc.). The illumination unit 301 includes a laser mount 310, an emitter 320 and a fold element 330.

The laser mount 310 is a common substrate (e.g., silicon, InGaAs, or other III-V material on a common carrier, such as various ceramics or metals, to facilitate mounting and thermal transfer) used to hold one or more emitters and one or more fold elements. In the example of FIG. 3A, the laser mount 310A holds the emitter 320 and the fold element 330.

The emitter 320 is an embodiment of the emitter 242 of FIG. 2. The emitter 320 includes a front face 322 and a back face 326. Each of the front face 322 and the back face 326 is a flat surface along the x-z plane of the emitter 320. An origination point is a location on the emitter 320 from which the emission of an image light originates toward the fold element 330. In the example of FIG. 3A, the emitter 320 emits a source light along the negative Y direction from an origination point (not shown) on the back face 326 to a fold element 330.

The fold element 330 is an optical device that redirects the light emitted by the emitter 320 to any arbitrary direction. For example, a fold element may be a turning mirror, a refractive prism, diffractive optical element, liquid crystal or birefringent media to act as an optical prism or mirror, or some combination thereof. These elements can change the angle of the beam by an arbitrary angle, based upon the system architecture. In some configurations, the fold element 330 includes a reflective (metallic or dichroic) coating, an anti-reflective coating, polarization dependent filter (for phase, polarization, reflective/transmission control) coating, etc. In the example of FIG. 3A, the fold element 330 receives the source light from the emitter 320 and folds the received source light along the positive Z-direction. In alternate embodiments, the fold element 330 can be configured to direct light to directions other than along the z axis. For instance, it could be any other angle by having the fold element set to either a more acute or obtuse angle. The dimensions of the fold element may be in part determined by a spot size of light emitted from the emitter 320 that is incident on the fold element 330 (e.g., a reflective surface of the fold element 330 should be larger than the spot size). Dimensions of the fold element may range from approximately 0.1 to 5.0 millimeters, based upon both distance to the emitter 320, properties of the laser beam, and taking into account what other passive/active optical components could be included in the emitter 320 layout (not shown), such as a reflective, refractive, or diffractive optical element (for instance to collimate the beam).

The optical path 340 is a path of a source light emitted from the back face 326 of the emitter 320 after folding by the fold element 330. As illustrated, the optical path 340 folds the image light emitted from the emitter 320 by approximately 90 degrees such that light exiting from the illumination unit 301 is propagating in the positive Z-direction.

Figure 3B:
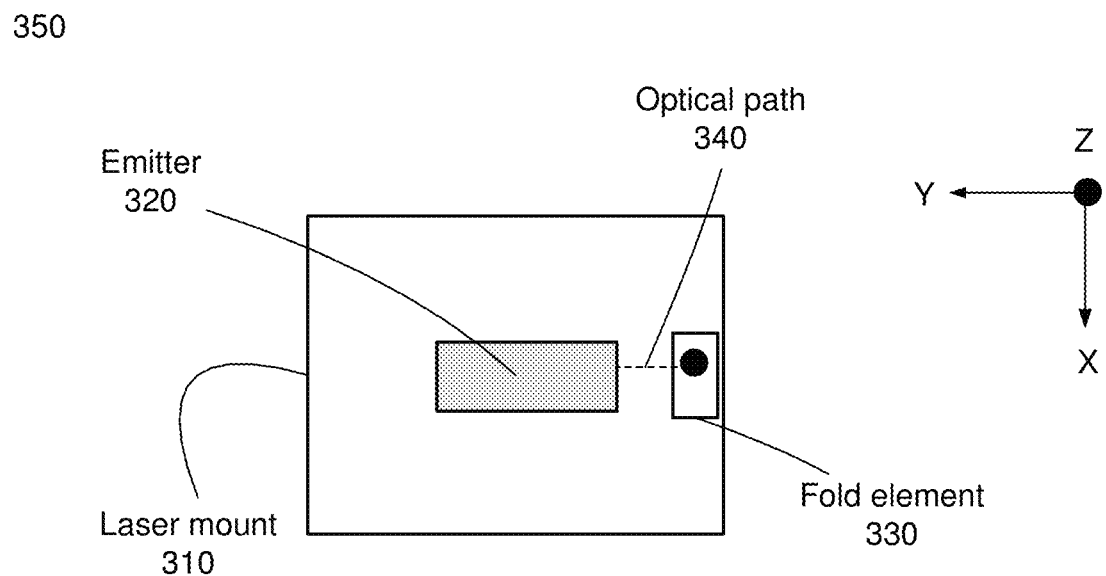
FIG. 3B is a top view of the illumination unit of FIG. 3A, in accordance with an embodiment.

FIG. 3B is a top view 350 of the illumination unit 301 of FIG. 3A, in accordance with an embodiment. The top view 350 includes the laser mount 310, the emitter 320, and the fold element 330. The optical path 340 shows the source light folded up along the Z-direction.

Figure 4A:
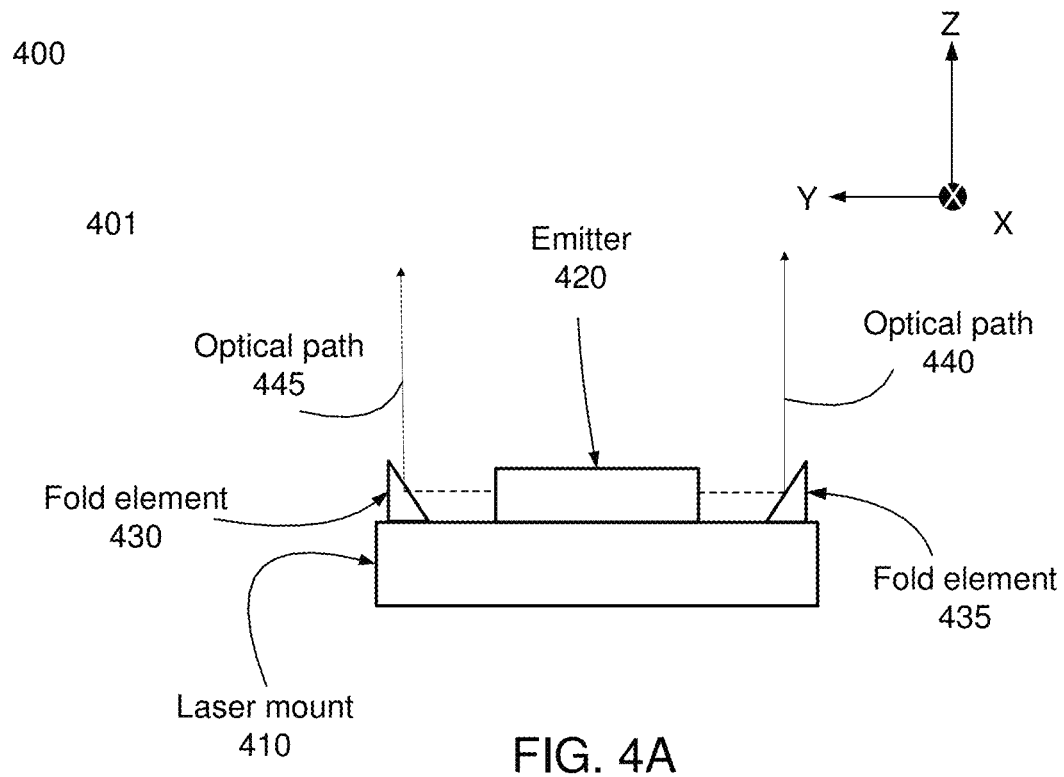
FIG. 4A is a side view of an illumination unit with multiple optical paths and two fold elements, in accordance with an embodiment.

FIG. 4A is a side view 400 of an illumination unit 401, in accordance with an embodiment. In some embodiments, the illumination unit 401 may be part of the illumination source assembly 220. The illumination unit 401 includes a laser mount 410, an emitter 420, a fold element 430 and a fold element 435.

The laser mount 410 is an embodiment of the laser mount 310 of FIG. 3A. In the example of FIG. 4A, the laser mount 410 holds the emitter 420, the fold element 430 and the fold element 435.

The emitter 420 is an embodiment of the emitter 242 of FIG. 2. In the example of FIG. 4A, the emitter 420 emits a first source light along the Y-direction from an origination point (not shown) to a fold element 430. The emitter 420 emits a second source light along the negative Y-direction from an origination point (not shown) to a fold element 435.

The fold element 430 is an embodiment of the fold element 330. In the example of FIG. 4A, the fold element 430 receives the first source light along the Y-direction from the emitter 420 and folds the received source light along the positive Z-direction. The fold element 435 is an embodiment of the fold element 330. The fold element 435 receives the second source light along the negative Y-direction from the emitter 420 and folds the received source light along the positive Z-direction.

The optical path 440 is a path of a source light emitted from the emitter 420 after folding by the fold element 435. As illustrated, the optical path 440 folds the image light emitted from the emitter 420 by 90 degrees such that light exiting from the illumination unit 401 is propagating in the positive Z-direction The optical path 445 is a path of a source light emitted from the emitter 420 after folding by the fold element 430. As illustrated, the optical path 445 folds the image light emitted from the emitter 420 by 90 degrees such that light exiting from the illumination unit 401 is propagating in the positive Z-direction. In alternate embodiments, one or both of the fold elements 430 and 435 may be configured such that the optical paths 445 and/or the optical path 440 propagates in some other direction, including out of the YZ plane, as illustrated.

Figure 4B:
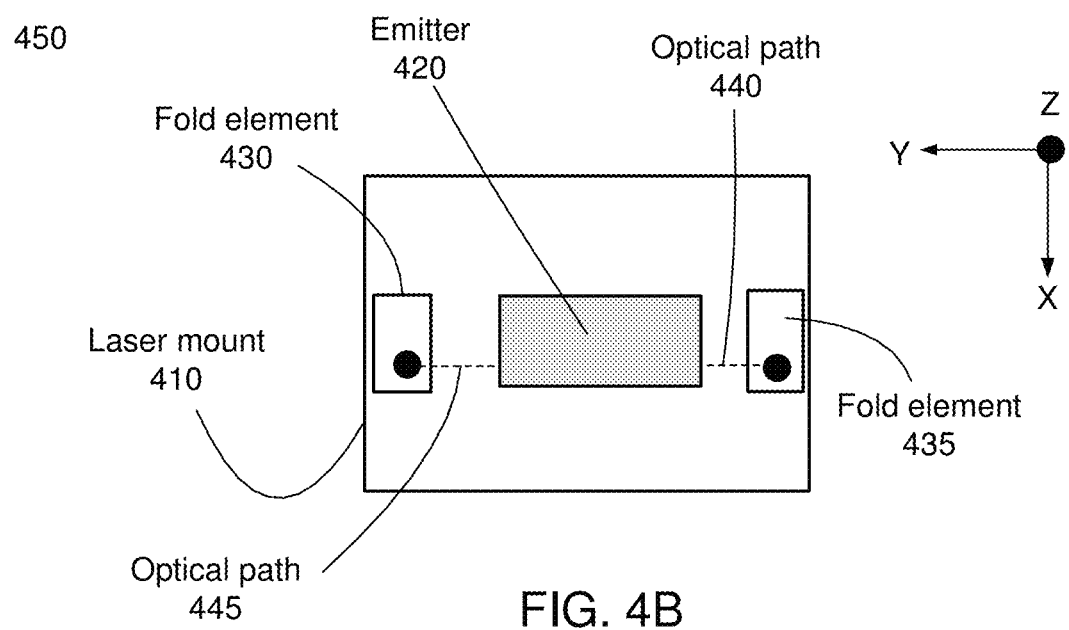
FIG. 4B is a top view of the illumination unit of FIG. 4A with multiple optical paths from a front face and a back face and two fold elements, in accordance with an embodiment.

FIG. 4B is a top view 450 of the illumination unit 401 of FIG. 4A, in accordance with an embodiment. The top view 450 includes the laser mount 410, the emitter 420, the fold element 430 and the fold element 435. The optical path 440 and the optical path 445 show the source light folded up along the Z-direction.

Figure 5A:
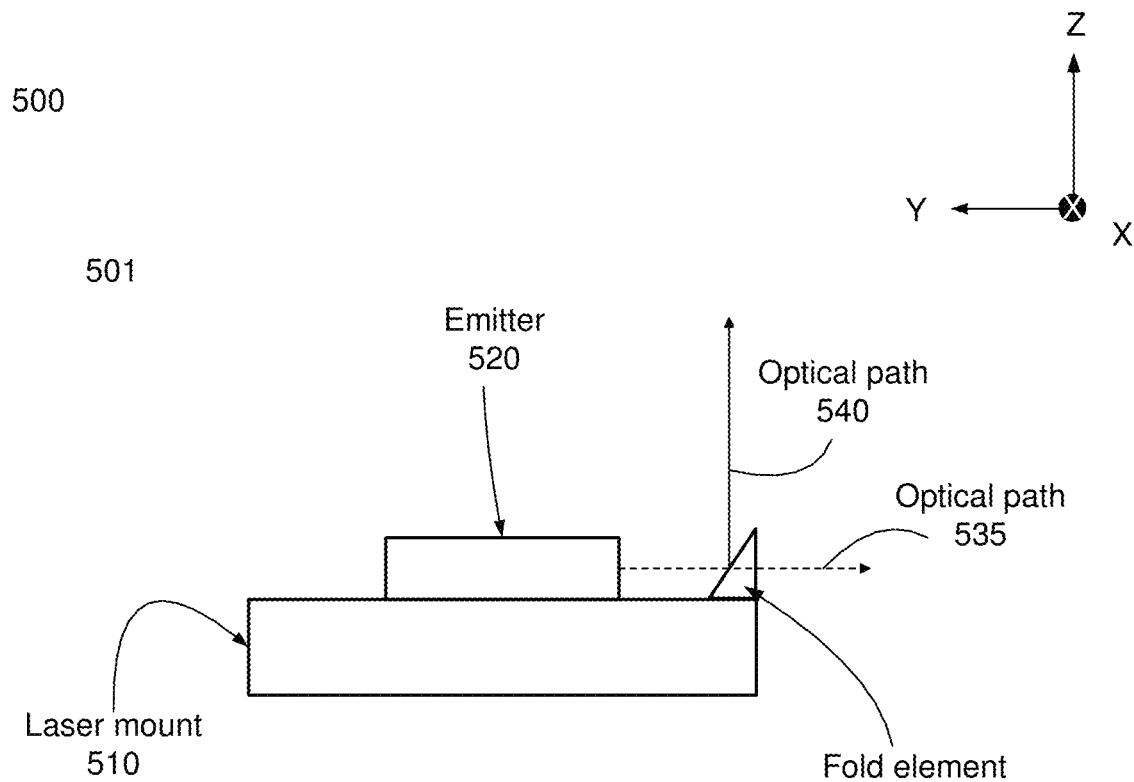
FIG. 5A is a side view of the illumination unit with an out-of-plane optical path, an in-plane optical path and a single fold element, in accordance with an embodiment.

FIG. 5A is a side view 500 of an illumination unit 501, in accordance with an embodiment. In some embodiments, the illumination unit 501 may be part of the illumination source assembly 220. The illumination unit 501 includes a laser mount 510, an emitter 520, and a fold element 530.

The laser mount 510 is an embodiment of the laser mount 310 of FIG. 3A. In the example of FIG. 5A, the laser mount 510 holds the emitter 520, and the fold element 530.

The emitter 520 is an embodiment of the emitter 242 of FIG. 2. In the example of FIG. 5A, the emitter 520 emits a first source light along the negative Y-direction from a first origination point (not shown) to a fold element 530. The emitter 520 emits a second source light along the negative Y-direction from a second origination point (not shown). In some embodiments, the emitter 520 is composed of multiple emitters.

The fold element 530 is an embodiment of the fold element 330 of FIG. 3A. In the example of FIG. 5A, the fold element 530 receives the first source light along the negative Y-direction from the emitter 520 and folds the received source light along the Z-direction.

The optical path 535 is a path of a source light emitted from the emitter 520 without any folding. As illustrated, the optical path 535 shows the light exiting from the illumination unit 501 propagating in the negative Y-direction. The optical path 540 is a path of a source light emitted from the emitter 520 after folding up by the fold element 530 along the positive Z-direction. As illustrated, the optical path 540 folds the source light emitted from the emitter 520 by 90 degrees such that light exiting from the illumination unit 501 is propagating in the positive Z-direction. In alternate embodiments, the fold element 535 may be configured such that the optical path 540 propagates in some other direction.

Figure 5B:
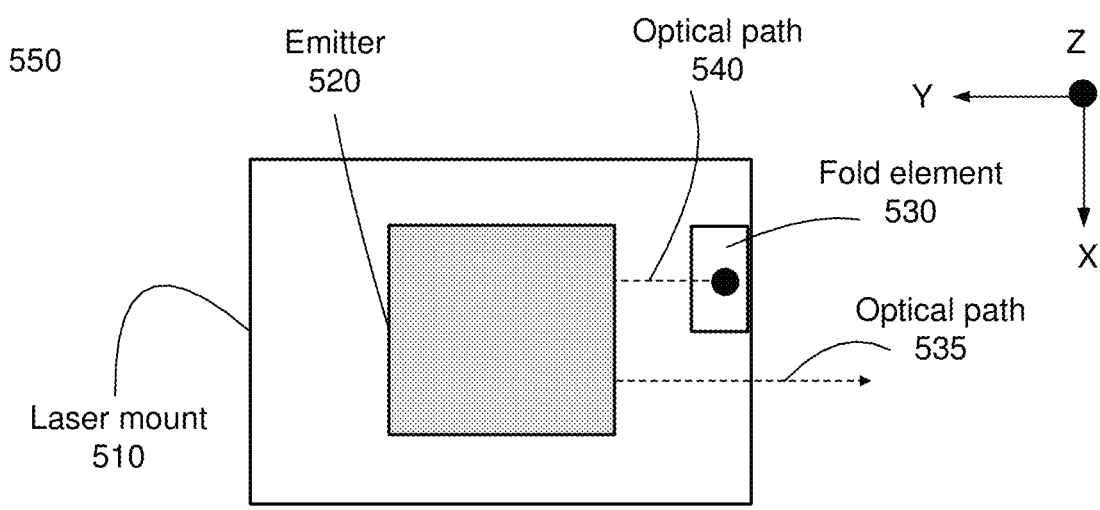
FIG. 5B is a top view of the illumination unit of FIG. 5A with an out-of-plane optical path, an in-plane optical path and a single fold element, in accordance with an embodiment.

FIG. 5B is a top view 550 of the illumination unit 501 of FIG. 5A, in accordance with an embodiment. The top view 550 includes the laser mount 510, the emitter 520, and the fold element 530. The optical path 535 shows the source light emitted from the emitter 520 propagating along the negative Y-direction. The optical path 540 shows the source light folded up along the positive Z-direction.

Figure 6A:
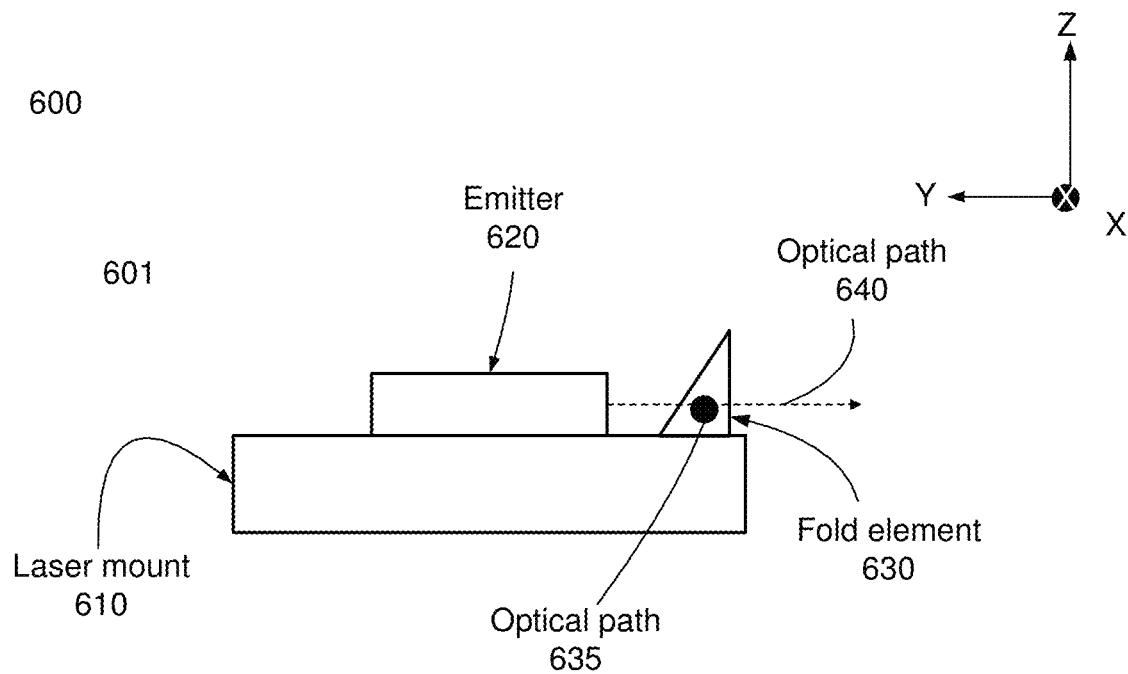
FIG. 6A is a side view of the illumination unit with two in-plane optical paths and a single fold element, in accordance with an embodiment.

FIG. 6A is a side view 600 of an illumination unit 601, in accordance with an embodiment. In some embodiments, the illumination unit 601 may be part of the illumination source assembly 220. The illumination unit 601 includes a laser mount 610, an emitter 620, and a fold element 630.

The laser mount 610 is an embodiment of the laser mount 310 of FIG. 3A. In the example of FIG. 6A, the laser mount 610 holds the emitter 620, and the fold element 630.

The emitter 620 is an embodiment of the emitter 242 of FIG. 2. In the example of FIG. 6A, the emitter 620 emits a first source light along the negative Y-direction from a first origination point (not shown) to a fold element 630. The emitter 620 emits a second source light along the negative Y-direction from a second origination point (not shown). In some embodiments, the emitter 620 is composed of multiple emitters.

The fold element 630 is an embodiment of the fold element 330 of FIG. 3A. In the example of FIG. 6A, the fold element 630 receives the first source light along the negative Y-direction from the emitter 620 and folds the received source light along the Z-direction.

The optical path 635 is a path of a source light emitted from the emitter 620 after folding by the fold element 630. As illustrated, the optical path 635 folds the image light emitted from the emitter 620 by 90 degrees such that light exiting from the illumination unit 601 is propagating in the negative X-direction. The optical path 640 is a path of a source light emitted from the emitter 620 without any folding. As illustrated, the optical path 640 shows the light exiting from the illumination unit 601 propagating in the negative Y-direction. In alternate embodiments, the fold element 630 may be configured such that the optical path 635 propagates in some other direction.

Figure 6B:
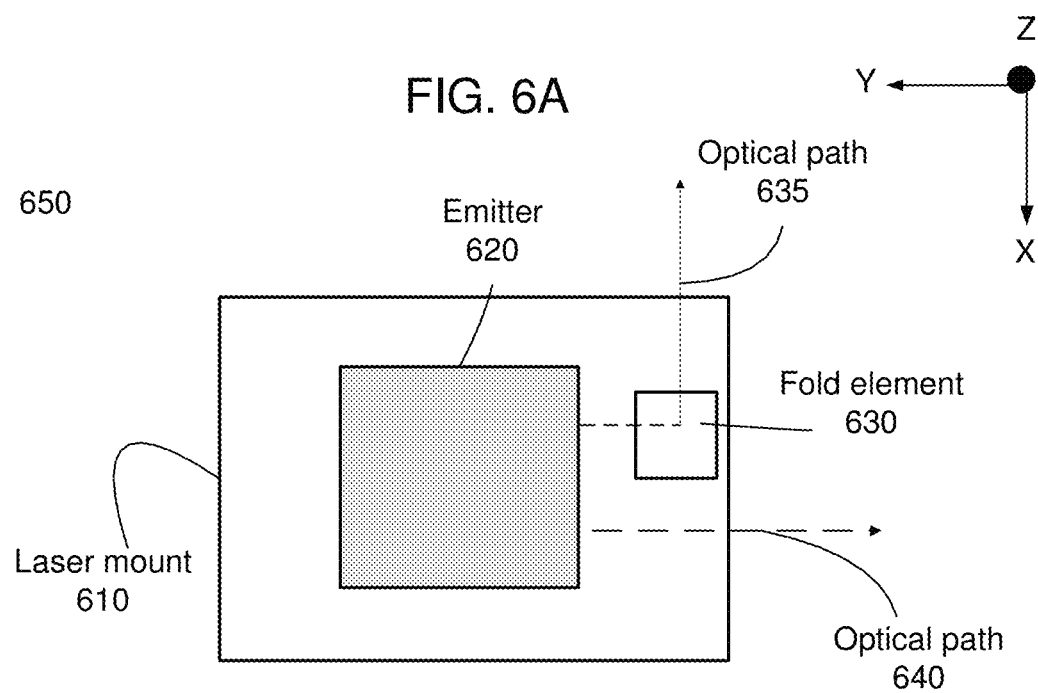
FIG. 6B is a top view of the illumination unit of FIG. 6A with two in-plane optical paths and a single fold element, in accordance with an embodiment.

FIG. 6B is a top view 650 of the illumination unit 601 of FIG. 6A, in accordance with an embodiment. The top view 650 includes the laser mount 610, the emitter 620, and the fold element 630. The optical path 635 shows the source light folded along the negative X-direction. The optical path 640 shows the source light emitted from the emitter 620 propagating along the negative Y-direction.

Figure 7A:
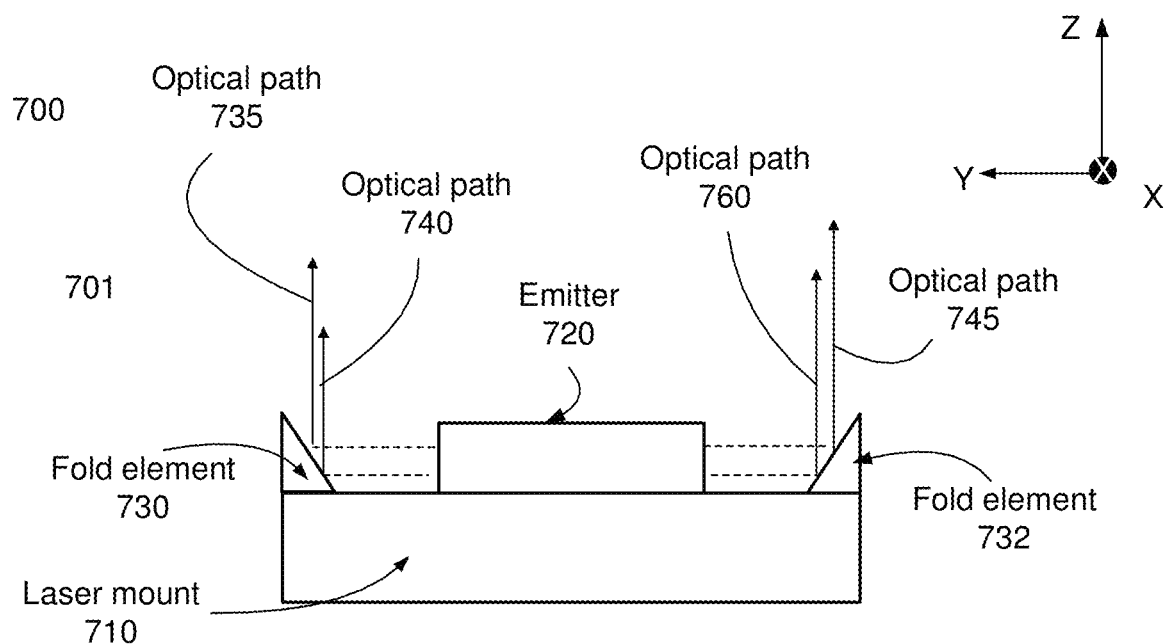
FIG. 7A is a side view of the illumination unit with multiple optical paths and multiple fold elements, in accordance with an embodiment.

FIG. 7A is a side view 700 of an illumination unit 701, in accordance with an embodiment. In some embodiments, the illumination unit 701 may be part of the illumination source assembly 220. The illumination unit 701 includes a laser mount 710, an emitter 720, a fold element 730, a fold element 732, a fold element 750 and a fold element 755.

The laser mount 710 is an embodiment of the laser mount 310 of FIG. 3A. In the example of FIG. 7A, the laser mount 710 holds the emitter 720, the fold element 730, the fold element 732, the fold element 750, and the fold element 755.

The emitter 720 is an embodiment of the emitter 242 of FIG. 2. In the example of FIG. 7A, the emitter 720 emits a first source light along the Y-direction from a first origination point (not shown) to the fold element 730. The emitter 720 emits a second source light along the negative Y-direction from a second origination point (not shown) to the fold element 732. The emitter 720 emits a third source light along the negative Y-direction from a third origination point (not shown) to the fold element 750. The emitter 720 emits a fourth source light along the Y-direction from a fourth origination point (not shown) to the fold element 755.

Each of the fold element 730, the fold element 732, the fold element 750 and the fold element 755 is an embodiment of the fold element 330 of FIG. 3A. In the example of FIG. 7A, the fold element 730 receives the first source light along the Y-direction from the emitter 720 and folds the received source light along the z-direction. The fold element 732 receives the second source light along the negative Y-direction from the emitter 720 and folds the received source light along the Z-direction. The fold element 750 receives the third source light along the negative Y-direction from the emitter 720 and folds the received source light along the Z-direction. The fold element 755 receives the fourth source light along the Y-direction from the emitter 720 and folds the received source light along the Z-direction.

The optical path 735 is a path of a source light emitted from the emitter 720 after folding by the fold element 730. As illustrated, the optical path 735 folds the image light emitted from the emitter 720 by 90 degrees such that light exiting from the illumination unit 701 is propagating in the positive Z-direction. The optical path 740 is a path of a source light emitted from the emitter 720 after folding by the fold element 755. As illustrated, the optical path 740 shows the light exiting from the illumination unit 701 propagating in the positive Z-direction. The optical path 745 is a path of a source light emitted from the emitter 720 after folding by the fold element 732. As illustrated, the optical path 745 shows the light exiting from the illumination unit 701 propagating in the positive Z-direction. The optical path 760 is a path of a source light emitted from the emitter 720 after folding by the fold element 750. As illustrated, the optical path 760 shows the light exiting from the illumination unit 701 propagating in the positive Z-direction. In alternate embodiments, some or all of the fold elements 730, 732, 750, 755 may be configured such that they direct their respective optical path 735, 745, 760, 740 in some other direction.

Figure 7B:
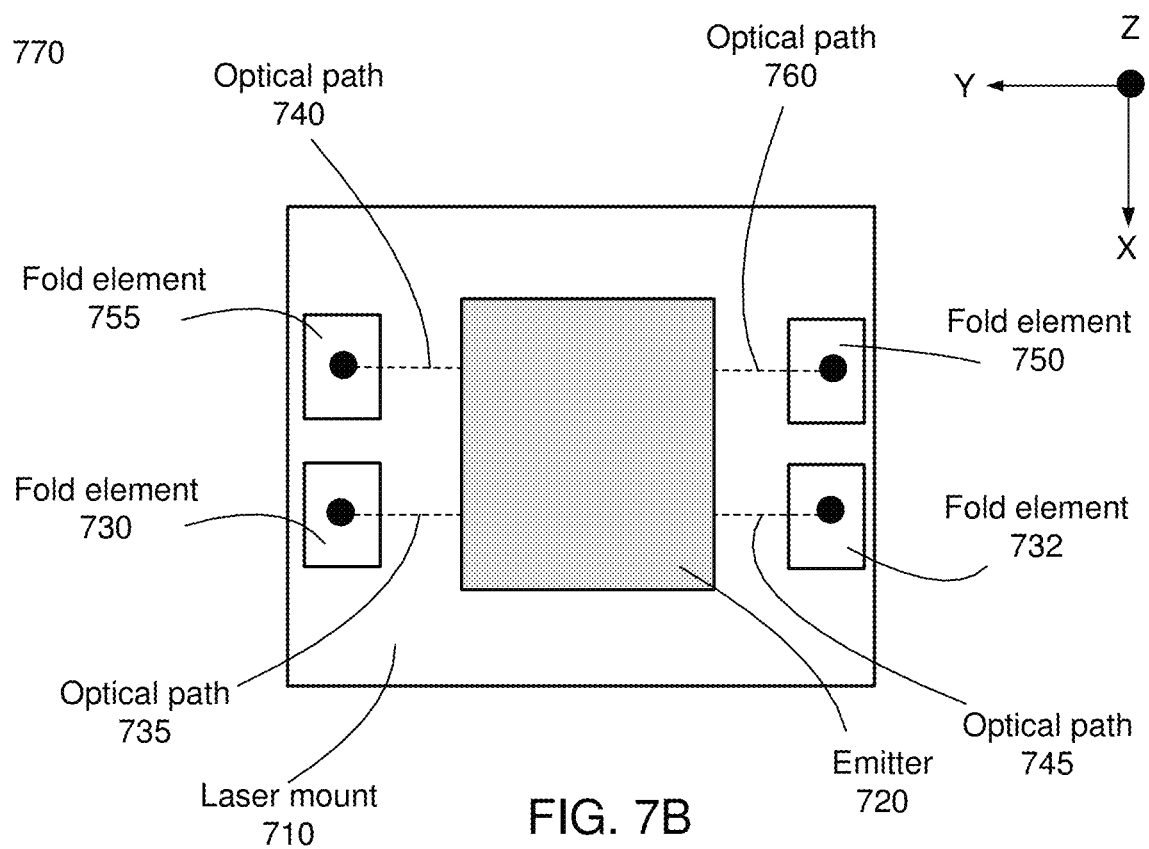
FIG. 7B is a top view of the illumination unit of FIG. 7A with multiple optical paths and multiple fold elements, in accordance with an embodiment.

FIG. 7B is a top view 770 of the illumination unit 701 of FIG. 7A, in accordance with an embodiment. The top view 770 includes the laser mount 710, the emitter 720, the fold element 732, the fold element 750 and the fold element 755. Each of the optical paths 735, 740, 745 and 760 shows the source light folded up along the positive Z-direction.

System Overview

Figure 8:
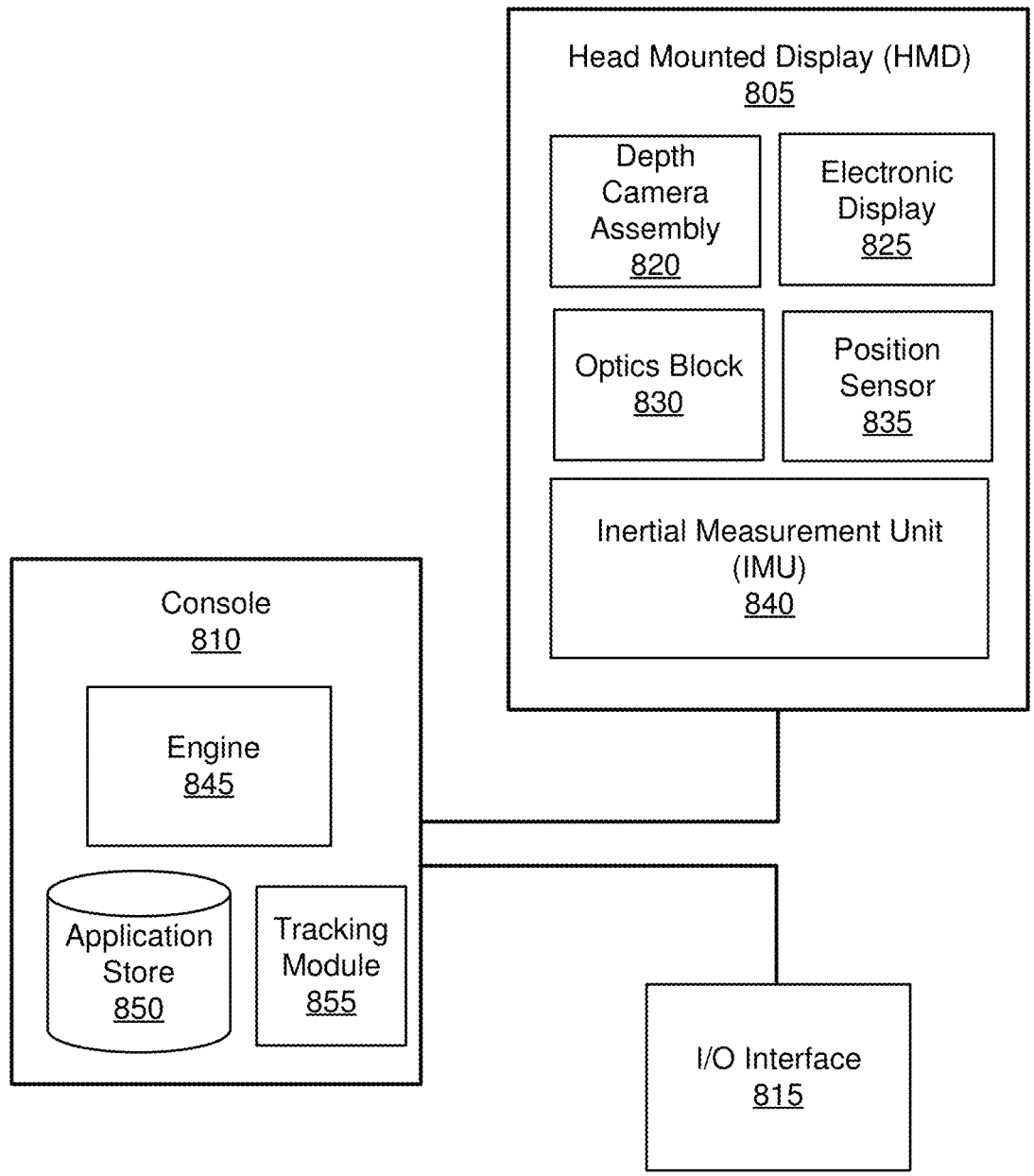
FIG. 8 is a block diagram of a system environment, in accordance with an embodiment.

FIG. 8 is a block diagram of a system environment 800, in accordance with an embodiment. The HMD system 805 may operate in a VR system environment, an AR system environment, a MR system environment, or some combination thereof. In alternate embodiments, the depth camera assembly inside the HMD system 805 may also work in a remote system such as a remote 'tower', a cellphone, or any other wearable, off-head, devices. The HMD system 805 shown by FIG. 8 comprises a HMD 805 and an input/output (I/O) interface 815 that is coupled to the console 810. While FIG. 8 shows an example HMD system 805 including one HMD 805 and an I/O interface 815, in other embodiments, any number of these components may be included in the HMD system 805. The system environment 800 shown by FIG. 8 comprises a head mounted display (HMD) 805 and an input/output (I/O) interface 815 that is coupled to a console 810. While FIG. 8 shows an example system environment 800 including one HMD 805 and one I/O interface 815, in other embodiments, any number of these components may be included in the system environment 800. For example, there may be multiple HMDs 805 each having an associated I/O interface 815, with each HMD 805 and I/O interface 815 communicating with the console 810. In alternative configurations, different and/or additional components may be included in the system environment 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the HMD 805.

The HMD 805 is a head-mounted display that presents content to a user comprising virtual and/or augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 805, the console 810, or both, and presents audio data based on the audio information. The HMD 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

The HMD 805 includes a depth camera assembly (DCA) 820, an electronic display 825, an optics block 830, one or more position sensors 835, and an inertial measurement Unit (IMU) 840. Some embodiments of the HMD 805 have different components than those described in conjunction with FIG. 8. Additionally, the functionality provided by various components described in conjunction with FIG. 8 may be differently distributed among the components of the HMD 805 in other embodiments.

The DCA 820 captures data describing depth information of an area surrounding the HMD 805. The data describing depth information may be associated with one or a combination of the following techniques used to determine depth information: stereo vision, photometric stereo, SL, and ToF. The DCA 820 can compute the depth information using the data, or the DCA 820 can send this information to another device such as the VR console 810 that can determine the depth information using data from the DCA 820.

The DCA 820 includes an illumination source assembly, an imaging device, and a controller. The illumination source assembly of the DCA 820 is configured to illuminate a local area with one or more structured light patterns in accordance with emission instructions from the controller. The illumination source assembly includes one or more emitters on a single substrate and one or more fold elements configured to determine one or more depth information of a local area. A fold element (e.g., a prism or mirror) folds the optical path of the source light received from each of the emitters. Light from the one or more emitters may be folded differently such that each emitter has its own, and potentially unique, optical path. In one configuration, a fold element can be utilized for all emitters to allow a smaller package. In a different configuration, each emitter can have a different (or none at all) fold element. In an alternate configuration, one or more of the light emitted by the emitters would be incident on the fold element, while one or more of the emitted light would not be, facilitating an angular offset of 0 to 90 degrees between the two optical paths. In yet another configuration, the emitters do not have to emit from the same surface. Instead, one or more optical paths can go through a front face of the emitter, while one or more optical path can then be allowed to emit from the back face of the emitter along with passing through an optional one or more fold elements. The imaging device captures ambient light and light from one or more emitters is reflected from objects in the local area. The controller coordinates how the illumination source emits light and how the imaging device captures light. In some embodiments, the controller may also determine depth information associated with the local area using the captured images.

The electronic display 825 displays 2D or 3D images to the user in accordance with data received from the console 810. In various embodiments, the electronic display 825 comprises a single electronic display or multiple electronic displays (e.g., a display for each eye of a user). Examples of the electronic display 825 include: a liquid crystal display (LCD), an organic light emitting diode (OLED) display, an active-matrix organic light-emitting diode display (AMO-LED), some other display, or some combination thereof.

The optics block 830 magnifies image light received from the electronic display 825, corrects optical errors associated with the image light, and presents the corrected image light to a user of the HMD 805. In various embodiments, the optics block 830 includes one or more optical elements. Example optical elements included in the optics block 830 include: an aperture, a Fresnel lens, a convex lens, a concave lens, a filter, a reflecting surface, or any other suitable optical element that affects image light. Moreover, the optics block 830 may include combinations of different optical elements. In some embodiments, one or more of the optical elements in the optics block 830 may have one or more coatings, such as partially reflective or anti-reflective coatings.

Magnification and focusing of the image light by the optics block 830 allows the electronic display 825 to be physically smaller, weigh less and consume less power than larger displays. Additionally, magnification may increase the field of view of the content presented by the electronic display 825. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 830 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 825 for display is pre-distorted, and the optics block 830 corrects the distortion when it receives image light from the electronic display 825 generated based on the content.

The IMU 840 is an electronic device that generates data indicating a position of the HMD 805 based on measurement signals received from one or more of the position sensors 835 and from depth information received from the DCA 820. A position sensor 835 generates one or more measurement signals in response to motion of the HMD 805. Examples of position sensors 835 include: one or more accelerometers, one or more gyroscopes, one or more magnetometers, another suitable type of sensor that detects motion, a type of sensor used for error correction of the IMU 840, or some combination thereof. The position sensors 835 may be located external to the IMU 840, internal to the IMU 840, or some combination thereof.

Based on the one or more measurement signals from one or more position sensors 835, the IMU 840 generates data indicating an estimated current position of the HMD 805 relative to an initial position of the HMD 805. For example, the position sensors 835 include multiple accelerometers to measure translational motion (forward/back, up/down, left/right) and multiple gyroscopes to measure rotational motion (e.g., pitch, yaw, roll). In some embodiments, the IMU 840 rapidly samples the measurement signals and calculates the estimated current position of the HMD 805 from the sampled data. For example, the IMU 840 integrates the measurement signals received from the accelerometers over time to estimate a velocity vector and integrates the velocity vector over time to determine an estimated current position of a reference point on the HMD 805. Alternatively, the IMU 840 provides the sampled measurement signals to the console 810, which interprets the data to reduce error. The reference point is a point that may be used to describe the position of the HMD 805. The reference point may generally be defined as a point in space or a position related to the HMD's 805 orientation and position.

The IMU 840 receives one or more parameters from the console 810. As further discussed below, the one or more parameters are used to maintain tracking of the HMD 805. Based on a received parameter, the IMU 840 may adjust one or more IMU parameters (e.g., sample rate). In some embodiments, certain parameters cause the IMU 840 to update an initial position of the reference point so it corresponds to a next position of the reference point. Updating the initial position of the reference point as the next calibrated position of the reference point helps reduce accumulated error associated with the current position estimated the IMU 840. The accumulated error, also referred to as drift error, causes the estimated position of the reference point to "drift" away from the actual position of the reference point over time. In some embodiments of the HMD 805, the IMU 840 may be a dedicated hardware component. In other embodiments, the IMU 840 may be a software component implemented in one or more processors.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840, as further described above, that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the HMD 805 for processing in accordance with information received from one or more of: the DCA 820, the HMD 805, and the I/O interface 815. In the example shown in FIG. 8, the console 810 includes an application store 850, a tracking module 855 and an engine 845. Some embodiments of the console 810 have different modules or components than those described in conjunction with FIG. 8. Similarly, the functions further described below may be distributed among components of the console 810 in a different manner than described in conjunction with FIG. 8.

The application store 850 stores one or more applications for execution by the console 810. An application is a group of instructions, that when executed by a processor, generates content for presentation to the user. Content generated by an application may be in response to inputs received from the user via movement of the HMD 805 or the I/O interface 815. Examples of applications include: gaming applications, conferencing applications, video playback applications, or other suitable applications.

The tracking module 855 calibrates the system environment 800 using one or more calibration parameters and may adjust one or more calibration parameters to reduce error in determination of the position of the HMD 805 or of the I/O interface 815. For example, the tracking module 855 communicates a calibration parameter to the DCA 820 to adjust the focus of the DCA 820 to more accurately determine positions of SL elements captured by the DCA 820. Calibration performed by the tracking module 855 also accounts for information received from the IMU 840 in the HMD 805 and/or an IMU 840 included in the I/O interface 815. Additionally, if tracking of the HMD 805 is lost (e.g., the DCA 820 loses line of sight of at least a threshold number of SL elements), the tracking module 855 may re-calibrate some or the entire system environment 800.

The tracking module 855 tracks movements of the HMD 805 or of the I/O interface 815 using information from the DCA 820, the one or more position sensors 835, the IMU 840 or some combination thereof. For example, the tracking module 855 determines a position of a reference point of the HMD 805 in a mapping of a local area based on information from the HMD 805. The tracking module 855 may also determine positions of the reference point of the HMD 805 or a reference point of the I/O interface 815 using data indicating a position of the HMD 805 from the IMU 840 or using data indicating a position of the I/O interface 815 from an IMU 840 included in the I/O interface 815, respectively. Additionally, in some embodiments, the tracking module 855 may use portions of data indicating a position or the HMD 805 from the IMU 840 as well as representations of the local area from the DCA 820 to predict a future location of the HMD 805. The tracking module 855 provides the estimated or predicted future position of the HMD 805 or the I/O interface 815 to the engine 845.

The engine 845 generates a 3D mapping of the area surrounding the HMD 805 (i.e., the "local area") based on information received from the HMD 805. In some embodiments, the engine 845 determines depth information for the 3D mapping of the local area based on information received from the DCA 820 that is relevant for techniques used in computing depth. The engine 845 may calculate depth information using one or more techniques in computing depth (e.g., stereo vision, photometric stereo, SL, ToF, or some combination thereof). In various embodiments, the engine 845 uses different types of information determined by the DCA 820 or a combination of types of information determined by the DCA 820.

The engine 845 also executes applications within the system environment 800 and receives position information, acceleration information, velocity information, predicted future positions, or some combination thereof, of the HMD 805 from the tracking module 855. Based on the received information, the engine 845 determines content to provide to the HMD 805 for presentation to the user. For example, if the received information indicates that the user has looked to the left, the engine 845 generates content for the HMD 805 that mirrors the user's movement in a virtual environment or in an environment augmenting the local area with additional content. Additionally, the engine 845 performs an action within an application executing on the console 810 in response to an action request received from the I/O interface 815 and provides feedback to the user that the action was performed. The provided feedback may be visual or audible feedback via the HMD 805 or haptic feedback via the I/O interface 815.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, the embodiments shown in each of FIGS. 3A-B, 4A-B, 5A-B, 6A-B and 7A-B are only a few representative examples of location and/or orientation of the plurality of emitters and the fold elements. Accordingly, modifying the location and/or orientation of each of the emitters and fold elements of the above embodiments on the corresponding laser mount will be apparent to one of ordinary skill in the art.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
an illumination source comprising:
one or more emitters on a single substrate, each emitter configured to emit a respective beam of light, and
one or more folding elements on the substrate that are separate and apart from the one or more emitters, the one or more folding elements configured to fold at least an optical path of the light projected from each of the one or more emitters; and
an imaging device configured to capture one or more images of a local area illuminated with the light from the illumination source.

2. The DCA of claim 1, wherein:
the one or more emitters comprises a first emitter configured to emit a first beam of light along a first dimension, and
the one or more folding elements comprises a first folding element configured to fold an optical path of the projected light from the first emitter along a second dimension different from the first dimension.

3. The DCA of claim 1, wherein:
the one or more emitters are configured to emit:
a first beam of light propagating in a first direction along a first dimension, and
a second beam of light propagating in a second direction that is different from the first direction; and
the one or more folding elements comprises a first folding element configured to redirect the light propagating in the first direction to a third direction that is different from the first dimension.

4. The DCA of claim 3, wherein the first direction and the third direction are parallel to a surface of the single substrate mounting the illumination source.

5. The DCA of claim 3, wherein each of the first beam of light and the second beam of light are emitted by a first emitter on the single substrate.

6. The DCA of claim 3, wherein the second beam of light is propagating in a second direction that different from the first direction, and
the one or more folding elements comprises:
a second folding element configured to redirect the light propagating in the second direction to the third direction that is different from the first dimension.

7. The DCA of claim 1, further comprising:
a controller configured to provide one or more images to a console, wherein the console is configured to determine depth information based in part on one or more images of the local area illuminated with the light from the illumination source, and generate a virtual object based in part on the depth information.

8. The DCA of claim 7, wherein the controller is configured to:
determine a first depth information based on the one or more images of the local area illuminated with a light from a first emitter of the illumination source;
determine a second depth information based on the one or more images of the local area illuminated with a light from a second emitter of the illumination source; and
update a digital model of the local area based on the first depth information and the second depth information, the digital model generating the virtual object.

9. The DCA of claim 1, wherein the one or more emitters are coupled to a flat surface of the substrate, and each respective beam of light emitted from the one or more emitters is substantially parallel with the surface.

10. The DCA of claim 9, wherein an emitter of the one or more emitters is configured to not emit light in a direction orthogonal to the surface of the substrate.

11. A head-mounted-display (HMD) comprising:
an electronic display configured to emit image light; and
a depth camera assembly (DCA) comprising:
an illumination source comprising:
one or more emitters on a single substrate, each emitter configured to emit a respective beam of light, and
one or more folding elements on the substrate that are separate and apart from the one or more emitters, the one or more folding elements configured to fold at least an optical path of the light projected from each of the one or more emitters; and
an imaging device configured to capture one or more images of a local area illuminated with the light from the illumination source; and
a controller configured to provide one or more images to a console, wherein the console is configured to determine a depth information based in part on one or more images of the local area illuminated with the light from the illumination source, and generate a virtual object based in part on the depth information.

12. The HMD of claim 11, wherein:
the one or more emitters comprises a first emitter configured to emit a first beam of light along a first dimension, and
the one or more folding elements comprises a first folding element configured to fold an optical path of the projected light from the first emitter along a second dimension different from the first dimension.

13. The HMD of claim 11, wherein:
the one or more emitters are configured to emit:
a first beam of light propagating in a first direction along a first dimension, and
a second beam of light propagating in a second direction that is different from the first direction; and
the one or more folding elements comprises a first folding element configured to redirect the light propagating in the first direction to a third direction that is different from the first dimension.

14. The HMD of claim 13, wherein each of the first beam of light and the second beam of light are emitted by a first emitter on the single substrate.

15. The HMD of claim 13, wherein the second beam of light is propagating in a second direction that is opposite the first direction, and
the one or more folding elements comprises:
a second folding element configured to redirect the light propagating in the second direction to the third direction that is different from the first dimension.

16. The HMD of claim 13, wherein the first direction and the third direction are parallel to a surface of the single substrate mounting the illumination source.

17. The HMD of claim 11, wherein the controller is configured to:
determine a first depth information based on the one or more images of the local area illuminated with a light from a first emitter of the illumination source;
determine a second depth information based on the one or more images of the local area illuminated with a light from a second emitter of the illumination source; and update a digital model of the local area based on the first depth information and the second depth information, the digital model generating the virtual object.

18. The HMD of claim 11, wherein the local area is an area surrounding the depth camera assembly of the HMD.

* * * * *